US009745718B2

(12) United States Patent
Mochimaru (10) Patent No.: US 9,745,718 B2
(45) Date of Patent: Aug. 29, 2017

(54) HYDRAULIC EXCAVATOR (71) Applicant: KOMATSU LTD., Tokyo (JP)

(72) Inventor: Yuuya Mochimaru, Komatsu (JP)

(73) Assignee: KOMATSU LTD., Tokyo (JP)

(*) Notice: Subject to any disclaimer, the term of this patent is extended or adjusted under 35 U.S.C. 154(b) by 0 days.

(21) Appl. No.: 14/912,498

(22) PCT Filed: Aug. 21, 2015

(86) PCT No.: PCT/JP2015/073550
§ 371 (c)(1),
(2) Date: Feb. 17, 2016

(87) PCT Pub. No.: WO2016/002973
PCT Pub. Date: Jan. 7, 2016

(65) Prior Publication Data
US 2017/0051472 A1 Feb. 23, 2017

(51) Int. Cl.
B60K 13/04 (2006.01)
E02F 9/08 (2006.01)
E02F 9/18 (2006.01)
E02F 3/32 (2006.01)
F01N 3/20 (2006.01)
F01N 13/08 (2010.01)
F01N 3/021 (2006.01)
F01N 13/00 (2010.01)

(52) U.S. Cl.
CPC .............. *E02F 9/0866* (2013.01); *E02F 3/32* (2013.01); *E02F 9/0841* (2013.01); *E02F 9/18* (2013.01); *F01N 3/021* (2013.01); *F01N 3/2066* (2013.01); *F01N 13/009* (2014.06); *F01N 13/08* (2013.01); *F01N 2590/08* (2013.01); *Y02T 10/24* (2013.01)

(58) Field of Classification Search
CPC .......... E02F 9/0866; E02F 9/18; F01N 13/009
See application file for complete search history.

(56) References Cited

U.S. PATENT DOCUMENTS

| 8,191,668 | B2 * | 6/2012 | Keane | B60K 13/04 180/296 |
| 8,857,557 | B2 * | 10/2014 | Sakamoto | B60K 11/04 180/296 |
| 8,915,328 | B2 * | 12/2014 | Okada | E02F 9/0866 180/309 |
| 8,950,535 | B2 * | 2/2015 | Harada | E02F 9/0866 180/296 |
| 8,955,638 | B2 * | 2/2015 | Hata | E02F 9/0866 180/296 |

(Continued)

FOREIGN PATENT DOCUMENTS

| JP | 2009-167806 A | 7/2009 |
| JP | 2010-247553 A | 11/2010 |

(Continued)

*Primary Examiner* — Hau Phan
*Assistant Examiner* — Jacob Meyer
(74) *Attorney, Agent, or Firm* — Drinker Biddle & Reath LLP (57) ABSTRACT An intermediate pipe is superimposed on both of a first exhaust treatment device and a second exhaust treatment device in a plan view. A counterweight is located in a direction of vehicle width of the first exhaust treatment device and the second exhaust treatment device in the plan view.

8 Claims, 5 Drawing Sheets

(56) References Cited

U.S. PATENT DOCUMENTS

| | | | |
|---|---|---|---|
| 8,997,468 B2* | 4/2015 | Kondo | F01N 13/002 60/295 |
| 9,016,426 B2* | 4/2015 | Himoto | E02F 9/0833 180/296 |
| 9,074,343 B2* | 7/2015 | Okuda | E02F 3/30 |
| 9,074,344 B1* | 7/2015 | Harada | E02F 3/764 |
| 9,103,254 B2 | 8/2015 | Merchant | |
| 9,151,014 B2* | 10/2015 | Arai | E02F 3/764 |
| 9,163,380 B2* | 10/2015 | Homma | E02F 9/0833 |
| 9,180,774 B2* | 11/2015 | Mizuno | B60K 13/04 |
| 9,382,690 B2* | 7/2016 | Okuda | B60K 13/04 |
| 9,388,725 B2* | 7/2016 | Ogawa | F01N 3/2066 |
| 9,388,729 B2* | 7/2016 | Himoto | E02F 9/0866 |
| 9,394,668 B2* | 7/2016 | Sakai | E02F 3/7631 |
| 9,453,326 B2* | 9/2016 | Shimohira | E02F 9/0841 |
| 9,469,511 B2* | 10/2016 | Terata | B01D 53/94 |
| 9,476,337 B2* | 10/2016 | Kobayashi | F01N 3/10 |
| 9,504,960 B2* | 11/2016 | Park | F01N 3/2066 |
| 9,534,355 B2* | 1/2017 | Kanou | E02F 9/18 |
| 2004/0200100 A1* | 10/2004 | Kojima | E02F 9/18 37/348 |
| 2010/0122865 A1* | 5/2010 | Okada | E02F 9/0866 180/309 |
| 2010/0186381 A1* | 7/2010 | Charles | F01N 3/025 60/282 |
| 2010/0192551 A1* | 8/2010 | Yokota | B60K 15/063 60/295 |
| 2012/0222413 A1* | 9/2012 | Golin | F01N 3/021 60/311 |
| 2012/0247861 A1* | 10/2012 | Mizuno | B60K 13/04 180/296 |
| 2013/0039817 A1* | 2/2013 | Fukuda | F01N 3/035 422/170 |
| 2013/0213726 A1* | 8/2013 | Okada | E02F 9/0866 180/309 |
| 2013/0319787 A1* | 12/2013 | Kobayashi | E02F 9/0866 180/309 |
| 2014/0262590 A1* | 9/2014 | Daborn | F01N 3/035 180/309 |
| 2014/0305110 A1* | 10/2014 | Himoto | E02F 9/0833 60/324 |
| 2014/0311132 A1* | 10/2014 | Arai | E02F 3/764 60/286 |
| 2014/0311148 A1* | 10/2014 | Tsuchihashi | B60K 13/04 60/689 |
| 2015/0211209 A1* | 7/2015 | Okuda | B60K 13/04 180/309 |
| 2016/0115671 A1* | 4/2016 | Sakai | E02F 3/7631 172/292 |
| 2016/0115840 A1* | 4/2016 | Azuma | F01N 13/009 180/309 |
| 2016/0138243 A1* | 5/2016 | Ogura | F01N 3/2066 180/309 |
| 2016/0215477 A1* | 7/2016 | Kumagai | B60K 13/04 |
| 2016/0273190 A1* | 9/2016 | Doi | E02F 9/18 |

FOREIGN PATENT DOCUMENTS

| | | |
|---|---|---|
| JP | 2011-226298 A | 11/2011 |
| JP | 2011-229433 A | 11/2011 |
| JP | 5205551 B2 | 6/2013 |
| JP | 2014-074339 A | 4/2014 |
| JP | 2014-211053 A | 11/2014 |
| JP | 2014-224428 A | 12/2014 |
| JP | 5768191 B1 | 8/2015 |
| WO | WO 2011/152306 A1 | 12/2011 |

* cited by examiner

HYDRAULIC EXCAVATOR

TECHNICAL FIELD

The present invention relates to a hydraulic excavator and particularly to a hydraulic excavator having an exhaust treatment device.

BACKGROUND ART

An exhaust treatment device is mounted on a hydraulic excavator. As the exhaust treatment device, for example, a diesel particulate filter device (DPF), a diesel oxidation catalyst device (DOC), a selective catalytic reduction device (SCR), and the like are available.

For example, Japanese Patent Laying-Open No. 2009-167806 (see PTD 1) and Japanese Patent Laying-Open No. 2011-226298 (see PTD 2) each disclose a work vehicle including an exhaust treatment device.

CITATION LIST

Patent Document

PTD 1: Japanese Patent Laying-Open No. 2009-167806
PTD 2: Japanese Patent Laying-Open No. 2011-226298

SUMMARY OF INVENTION

Technical Problem

A counterweight is attached to a hydraulic excavator in consideration of weight balance with a work implement. A large-sized counterweight is adopted in accordance with a weight of a work implement. Since a counterweight has a large size, it is difficult to ensure a large area occupied in a plan view (a two-dimensionally occupied area) as a region where an exhaust treatment device is to be arranged. In particular in a short tail swing hydraulic excavator, the problem above is noticeable.

The present invention was made in view of the problem above. An object of the present invention is to provide a hydraulic excavator capable of incorporating an exhaust treatment device even though a two-dimensionally occupied area for arranging the exhaust treatment device is small.

Solution to Problem

A hydraulic excavator according to the present invention includes an engine, a first exhaust treatment device, a second exhaust treatment device, an intermediate pipe, and a counterweight. The first exhaust treatment device treats an exhaust gas emitted from the engine. The second exhaust treatment device treats the exhaust gas which has passed through the first exhaust treatment device. The intermediate pipe guides the exhaust gas which has passed through the first exhaust treatment device to the second exhaust treatment device and is superimposed on both of the first exhaust treatment device and the second exhaust treatment device in a plan view. The counterweight is located in a direction of width of a vehicle with respect to the first exhaust treatment device and the second exhaust treatment device in the plan view.

According to the hydraulic excavator in the present invention, the intermediate pipe is superimposed on both of the first exhaust treatment device and the second exhaust treatment device in the plan view. As the intermediate pipe, the first exhaust treatment device, and the second exhaust treatment device are thus stacked in an upward/downward direction as being superimposed on one another, a two-dimensional area occupied by these members can be made smaller than in a case that these members are arranged in a lateral direction. Therefore, an exhaust treatment unit including these members can be arranged even in a small-sized hydraulic excavator in which a counterweight is located in the direction of width of the vehicle with respect to the first and second exhaust treatment devices in the plan view.

In the hydraulic excavator, the first exhaust treatment device is arranged above the intermediate pipe and the second exhaust treatment device is arranged below the intermediate pipe. Maintenance of the first exhaust treatment device is thus facilitated. Since the first exhaust treatment device is arranged above the intermediate pipe, a long distance from the engine to the first exhaust treatment device can be ensured. Therefore, a length of a connection pipe connecting the engine and the first exhaust treatment device to each other can be increased and arrangement of a bellows portion in the connection pipe is facilitated.

In the hydraulic excavator, the first exhaust treatment device is a diesel particulate filter device. For the diesel particulate filter device, maintenance for eliminating clogging with soot is required. In maintenance of the exhaust treatment unit, a serviceperson normally accesses the exhaust treatment unit from above. In the hydraulic excavator, as described above, since the diesel particulate filter device is located above the intermediate pipe, maintenance of the diesel particulate filter device is facilitated.

In the hydraulic excavator, the first exhaust treatment device is located above an upper surface of the counterweight. Thus, maintenance of the first exhaust treatment device can be provided without a serviceperson extending his/her hand into an engine compartment.

The hydraulic excavator further includes a connection pipe which guides the exhaust gas emitted from the engine to the first exhaust treatment device. A first connection portion between the connection pipe and the first exhaust treatment device and a second connection portion between the first exhaust treatment device and the intermediate pipe are located above the upper surface of the counterweight. Since the first connection portion and the second connection portion are located above the counterweight, the first and second connection portions can be attached and removed without a serviceperson extending his/her hand into the engine compartment.

The hydraulic excavator further includes a tail pipe which emits the exhaust gas which has passed through the second exhaust treatment device into atmosphere. Both of the connection pipe and the tail pipe are arranged on the same side with respect to the first exhaust treatment device. Since both of the connection pipe and the tail pipe are thus arranged on the same side with respect to the first exhaust treatment device, increase in two-dimensional area occupied by the exhaust treatment unit can be suppressed as compared with a case that the connection pipe and the tail pipe are arranged on sides opposite to each other with respect to the first exhaust treatment device.

The hydraulic excavator further includes a revolving frame and a support member. The revolving frame supports the engine. The support member supports the first exhaust treatment device, the second exhaust treatment device, and the intermediate pipe on the revolving frame.

Since the exhaust treatment unit is thus supported not on the engine but on the revolving frame, the exhaust treatment unit can be arranged closer to the engine. Therefore, a height position of the exhaust treatment unit can be lowered so that visual recognition of the rear by an operator who operates the hydraulic excavator is good.

Since the exhaust treatment unit is supported not on the engine but on the revolving frame, arrangement of the exhaust treatment unit as being displaced from a portion directly above the engine to the fore, aft, left, and/or right is facilitated. Therefore, as compared with a case that the exhaust treatment unit is arranged in a region directly above the engine, a height position of the exhaust treatment unit can be lowered so that visual recognition of the rear by an operator who operates the hydraulic excavator is good.

In the hydraulic excavator, the revolving frame has a center frame. The engine is mounted on the center frame, and the support member has a portion attached to the center frame Thus, the engine mounted on the center frame and the exhaust treatment unit supported by the support member can be in accurate registration with each other.

Advantageous Effects of Invention

As described above, according to the present invention, since the intermediate pipe is superimposed on both of the first exhaust treatment device and the second exhaust treatment device in the plan view, a hydraulic excavator capable of incorporating an exhaust treatment device even though a two-dimensionally occupied area for arranging the exhaust treatment device is small can be realized.

DESCRIPTION OF EMBODIMENTS

An embodiment of the present invention will be described hereinafter with reference to the drawings.

A structure of a hydraulic excavator in one embodiment of the present invention will initially be described.

In the present example, positional relation among portions will be described with an operator seated at an operator's seat in an operator's cab (cab) 31 being defined as the reference. A fore/aft direction refers to a fore/aft direction of the operator who sits at the operator's seat. A lateral direction (a direction of vehicle width) refers to a lateral direction of the operator who sits at the operator's seat. An upward/downward direction refers to an upward/downward direction of the operator who sits at the driver's seat.

A direction in which the operator sitting at the operator's seat faces is defined as a fore direction and a direction opposed to the fore direction is defined as an aft direction. A right side and a left side at the time when the operator sitting at the operator's seat faces front are defined as a right direction and a left direction, respectively. A foot side of the operator who sits at the operator's seat is defined as a lower side, and a head side is defined as an upper side.

Figure 1:
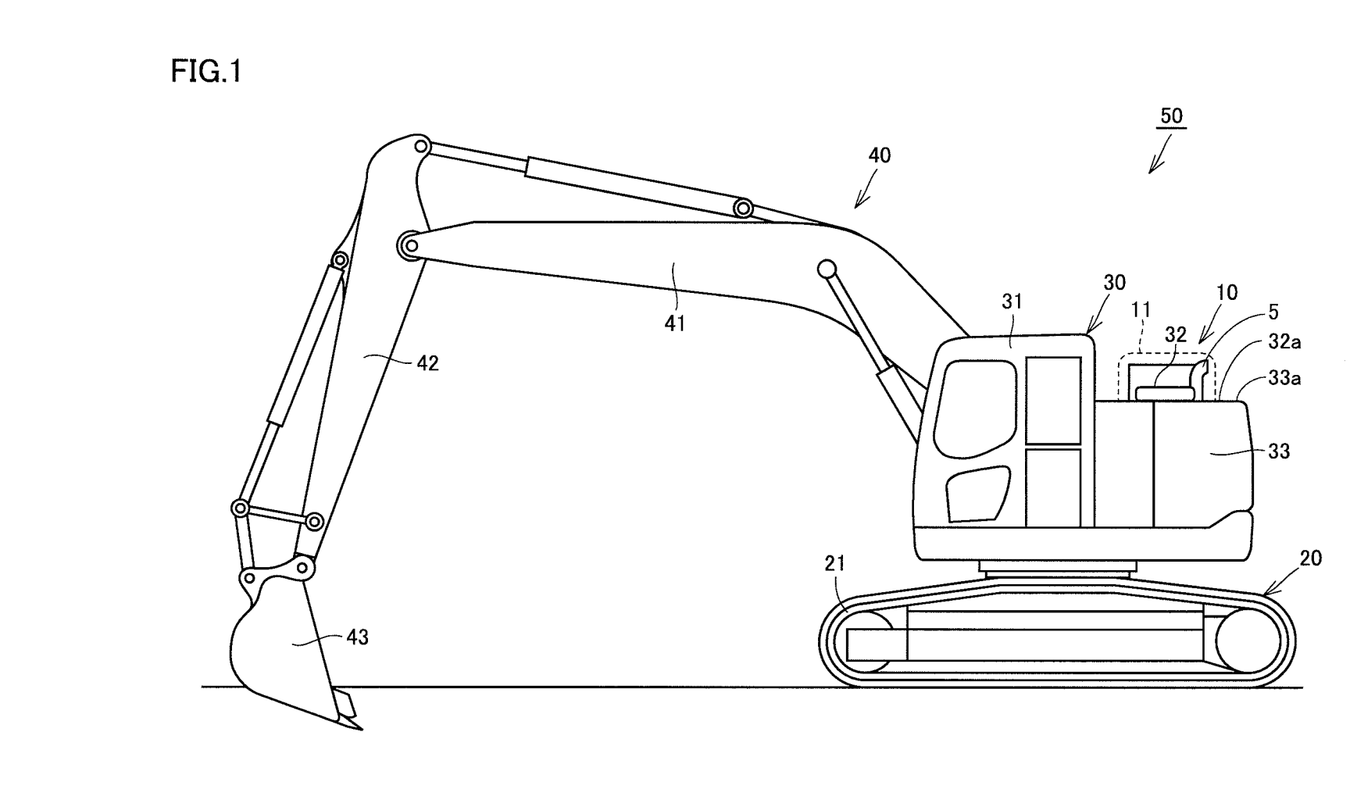
FIG. 1 is a side view schematically showing a structure of a hydraulic excavator according to one embodiment of the present invention.

FIG. 1 is a side view schematically showing a structure of a hydraulic excavator according to one embodiment of the present invention. As shown in FIG. 1, a hydraulic excavator 50 in the present embodiment is, for example, a short tail swing radius hydraulic excavator. The short tail swing radius hydraulic excavator can fully revolve with a slewing radius of a rear end of a revolving unit being within 120% of the total width of a travel unit in order to secure safety in the rear of a vehicle during slewing, although it fully revolves with a front minimal slewing radius exceeding 120% thereof (see the definition under Japanese Industrial Standards (JIS A 8340-4)).

This hydraulic excavator (vehicle) mainly has a travel unit 20, a revolving unit 30, and a work implement 40. Travel unit 20 and revolving unit 30 constitute a vehicular body of the hydraulic excavator.

Travel unit 20 has a pair of left and right crawler belt apparatuses 21. Each of the pair of left and right crawler belt apparatuses 21 has a crawler belt. Hydraulic excavator 50 is structured to be self-propelled as the pair of left and right crawler belt apparatuses 21 is driven to rotate.

Revolving unit 30 is set to be revolvable with respect to travel unit 20. This revolving unit 30 mainly has operator's cab 31, an engine hood 32, a counterweight 33, and an exhaust treatment cover 11.

Operator's cab 31 is arranged on a front left side (a front side of the vehicle) of revolving unit 30. Engine hood 32 and counterweight 33 are arranged on a rear side of revolving unit 30 (a rear side of the vehicle).

Engine hood 32 is arranged to cover an engine compartment from above. An engine unit (such as the engine and an exhaust treatment unit 10) is accommodated in the engine compartment. Counterweight 33 is arranged in the rear of and lateral to the engine compartment for keeping balance of a vehicular body during excavation or the like.

Exhaust treatment cover 11 covers exhaust treatment unit 10 from above. A tail pipe 5 included in exhaust treatment unit 10 is exposed through exhaust treatment cover 11 so as to be able to emit an exhaust gas into atmosphere. An outer geometry of exhaust treatment cover 11 is shown with a dashed line in FIG. 1 in order to show exhaust treatment unit 10 in a comprehensible manner. An outer geometry of exhaust treatment cover 11 is similarly shown with a dashed line also in FIG. 5 which will be described later.

Work implement 40 serves for such work as excavation of soil. Work implement 40 is pivotally supported on the front side of revolving unit 30. Work implement 40 has, for example, a boom 41, an arm 42, a bucket 43, and a hydraulic cylinder. Boom 41 has a base end portion pivotally coupled to revolving unit 30. Arm 42 has a base end portion rotatably coupled to a tip end portion of boom 41. Bucket 43 is rotatably coupled to a tip end portion of arm 42. Work implement 40 can be driven as each of boom 41, arm 42, and bucket 43 is driven by the hydraulic cylinder.

Figure 2:
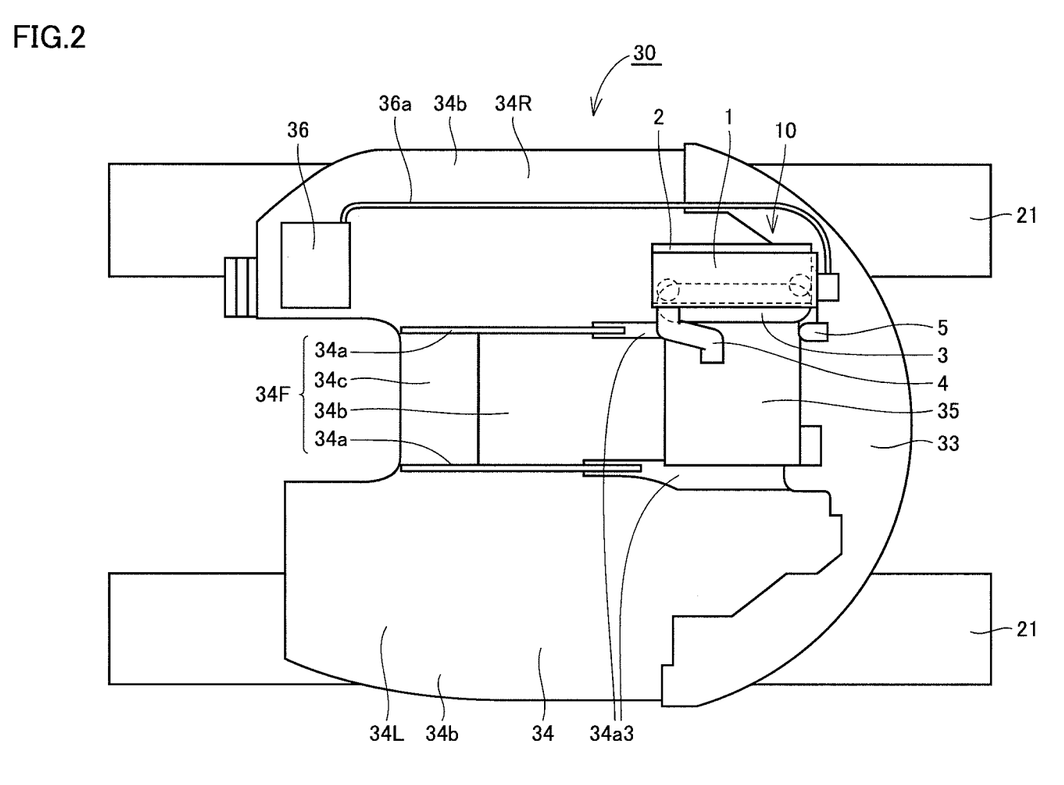
FIG. 2 is a plan view showing positions of an engine, an exhaust treatment unit, a reducing agent tank, and a counterweight in the hydraulic excavator shown in FIG. 1.

FIG. 2 is a plan view showing positions of the engine, the exhaust treatment unit, a reducing agent tank, and the counterweight in the hydraulic excavator shown in FIG. 1. As shown in FIG. 2, revolving unit 30 includes exhaust treatment unit 10, counterweight 33, a revolving frame 34, an engine 35, and a reducing agent tank 36. Exhaust treatment unit 10, counterweight 33, engine 35, and reducing agent tank 36 are mounted on revolving frame 34 and arranged on an upper surface of revolving frame 34.

Revolving frame 34 mainly has a pair of vertical plates 34a, a bottom plate 34b, and a coupling plate 34c. Bottom plate 34b is formed from a steel plate having a large thickness. The pair of vertical plates 34a is located in the center in the lateral direction of revolving frame 34. Each of the pair of vertical plates 34a is provided orthogonal to an upper surface of bottom plate 34b and erected upward from the upper surface of bottom plate 34b.

The pair of vertical plates 34a is arranged at a distance from each other in the direction of vehicle width of hydraulic excavator 50 and extends along the fore/aft direction. Each of the pair of vertical plates 34a is inclined such that a dimension in the upward/downward direction is smaller from a front end side toward a rear end. The pair of vertical plates 34a is coupled to each other by coupling plate 34c at a front end portion thereof.

The pair of vertical plates 34a and coupling plate 34c constitute a center bracket supporting the base end portion of work implement 40. A hole for a boom foot pin allowing upward/downward actuation of work implement 40 is formed in each of the pair of vertical plates 34a.

An upper plate 34a3 is attached to a rear upper end of each of the pair of vertical plates 34a so as to be integrated with vertical plate 34a.

The pair of vertical plates 34a, a portion of bottom plate 34b lying between the pair of vertical plates 34a, and coupling plate 34c constitute a center frame 34F. A portion of bottom plate 34b located on the right of center frame 34F forms a right deck frame 34R. A portion of bottom plate 34b located on the left of center frame 34F forms a left deck frame 34L. Center frame 34F, right deck frame 34R, and left deck frame 34L are integrally formed with bottom plate 34b being shared thereamong.

Engine 35 is mounted in the engine compartment in a portion in the rear of revolving frame 34. Since engine 35 is large in weight, it is arranged in the rear of revolving frame 34, in consideration of weight balance with work implement 40. Engine 35 is supported on the pair of left and right vertical plates 34a (upper plate 34a3). Engine 35 is mounted on center frame 34F with an engine mount portion (not shown) being interposed. The engine mount portion is fixed to center frame 34F in its entirety.

Exhaust treatment unit 10 is connected to engine 35 and structured to treat an exhaust from engine 35. Exhaust treatment unit 10 is any combination, for example, of a diesel particulate filter device, a diesel oxidation catalyst device, and a selective catalytic reduction device.

Exhaust treatment unit 10 is arranged lateral to engine 35, for example, on the right of engine 35. Exhaust treatment unit 10 is supported on revolving frame 34.

Reducing agent tank 36 is mounted on revolving frame 34, for example, in a front end portion of right deck frame 34R. Reducing agent tank 36 stores a reducing agent therein. For example, a urea solution is employed as the reducing agent.

Reducing agent tank 36 is connected to exhaust treatment unit 10 through a reducing agent pipe 36a. The reducing agent in reducing agent tank 36 is transferred through reducing agent pipe 36a to exhaust treatment unit 10 by a reducing agent pump (not shown). The reducing agent supplied to exhaust treatment unit 10 through reducing agent pipe 36a reacts with nitrogen oxide contained in the exhaust in exhaust treatment unit 10. Thus, a concentration of nitrogen oxide in the exhaust lowers.

When a urea solution is employed as the reducing agent, the urea solution is decomposed in an intermediate pipe 3 and converted to ammonia, and as a result of reaction between nitrogen oxide and ammonia, nitrogen oxide is decomposed into harmless nitrogen and oxygen. The exhaust of which amount of nitrogen oxide has lowered to an appropriate value is emitted from exhaust treatment unit 10.

Counterweight 33 is a weight arranged in a portion in the rear of revolving unit 30 for keeping balance of a vehicular body during excavation or the like. Counterweight 33 is attached to revolving frame 34 across center frame 34F, right deck frame 34R, and left deck frame 34L. Counterweight 33 has a rear surface in an annular shape in a plan view. The plan view means a view downward from above as shown in FIG. 3, in a direction perpendicular to the upper surface of bottom plate 34b of revolving frame 34.

Counterweight 33 is located in the rear of engine 35 and exhaust treatment unit 10 in the plan view, and arranged to extend from a position in the rear of exhaust treatment unit 10 to a position in the direction of vehicle width (a lateral position).

Figure 3:
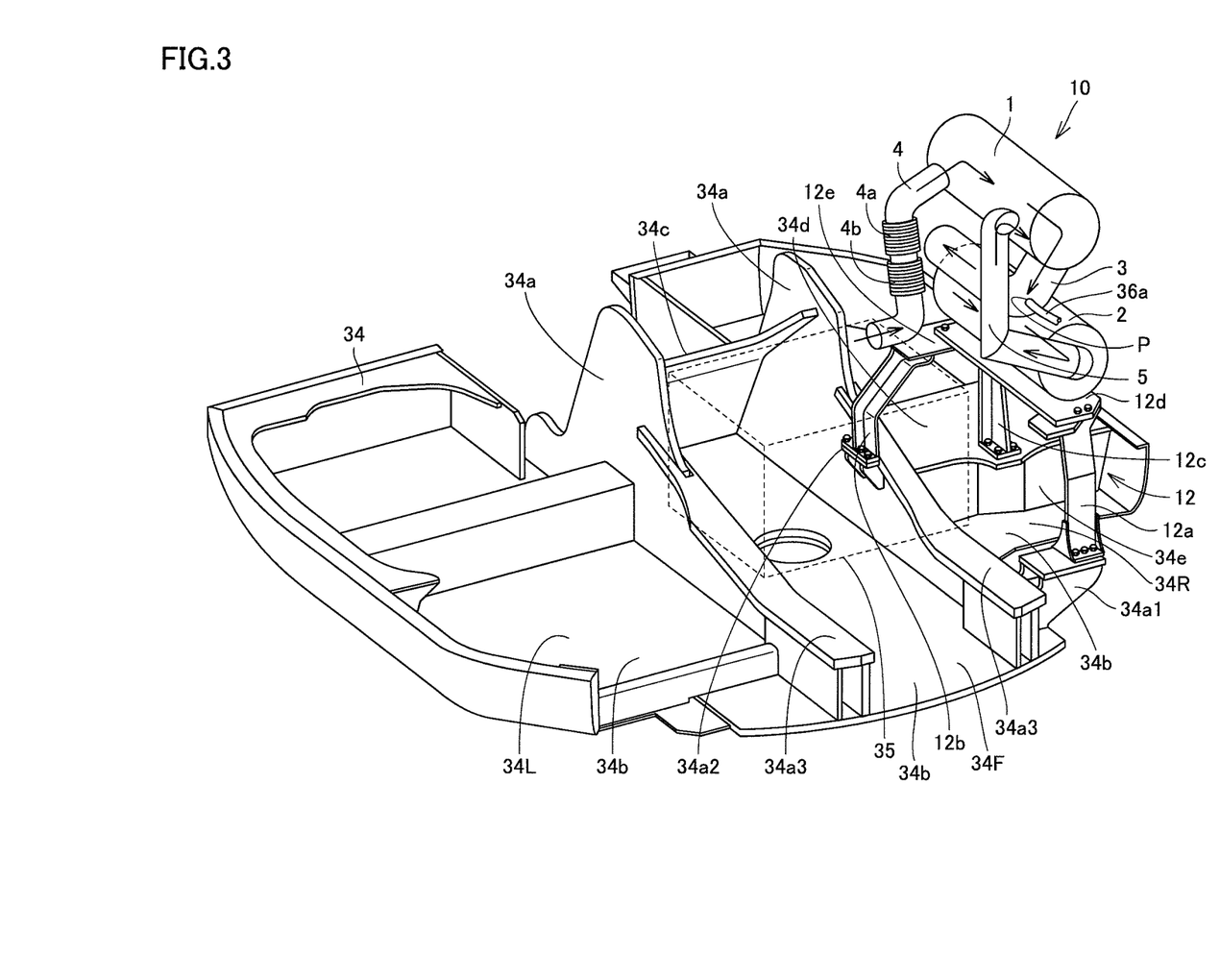
FIG. 3 is a perspective view showing attachment of the exhaust treatment unit to a revolving frame in the hydraulic excavator shown in FIG. 1.

FIG. 3 is a perspective view showing attachment of the exhaust treatment unit to the revolving frame in the hydraulic excavator shown in FIG. 1. As shown in FIG. 3, exhaust treatment unit 10 mainly has a first exhaust treatment device 1, a second exhaust treatment device 2, intermediate pipe 3, a connection pipe 4, and tail pipe 5.

First exhaust treatment device 1 is connected to engine 35 through connection pipe 4. First exhaust treatment device 1 is structured to treat an exhaust gas emitted from engine 35. Connection pipe 4 is structured to guide the exhaust gas emitted from engine 35 to first exhaust treatment device 1.

First exhaust treatment device 1 is connected to second exhaust treatment device 2 through intermediate pipe 3. Second exhaust treatment device 2 is structured to treat the exhaust gas which has passed through first exhaust treatment device 1. Intermediate pipe 3 is structured to guide the exhaust gas which has passed through first exhaust treatment device 1 to second exhaust treatment device 2.

Tail pipe 5 is connected to second exhaust treatment device 2. Tail pipe 5 is structured to emit the exhaust gas which has passed through second exhaust treatment device 2 into atmosphere.

First exhaust treatment device 1, second exhaust treatment device 2, and intermediate pipe 3 are arranged such that a longitudinal direction of first exhaust treatment device 1, a longitudinal direction of second exhaust treatment device 2, and a longitudinal direction of intermediate pipe 3 are in parallel to one another.

Connection pipe 4 is connected to engine 35 at a lower end. Connection pipe 4 extends upward from the lower end and is connected to first exhaust treatment device 1 at an upper end.

Connection pipe 4 has a central portion, a lower end portion, and an upper end portion. The central portion of connection pipe 4 extends linearly in the upward/downward direction. The lower end portion of connection pipe 4 is connected to the central portion such that the pipe is laterally bent with respect to the central portion. The upper end portion of connection pipe 4 is connected to the central portion such that the pipe is laterally bent with respect to the central portion. Each of the lower end portion and the upper end portion of connection pipe 4 may be bent at a right angle to the central portion or at an acute angle or an obtuse angle.

The upper end portion and the lower end portion of connection pipe 4 extend in directions opposite to each other with respect to the central portion. Each of the upper end portion and the lower end portion of connection pipe 4 extends from the central portion, for example, as being bent in the direction of vehicle width. Connection pipe 4 has, for example, a substantially S shape (or a substantially Z shape).

The central portion of connection pipe 4 is formed from a bellows expansion joint having an extendable and contractile bellows portion. Since connection pipe 4 can deform by extension and contraction owing to the bellows portion, an operation for connecting engine 35 and first exhaust treatment device 1 to each other through connection pipe 4 is facilitated. Connection pipe 4 is made of a steel material such as stainless steel from a point of view of heat resistance and corrosion resistance.

For example, two bellows portions 4a and 4b are provided as the bellows portion in connection pipe 4. The number of bellows portions 4a and 4b provided in this connection pipe 4 is not limited as such, and one bellows portion or three or more bellows portions may be provided.

This connection pipe 4 is connected to one end side in the longitudinal direction of first exhaust treatment device 1. First exhaust treatment device 1 has an outer geometry substantially in a columnar shape. First exhaust treatment device 1 extends linearly in the longitudinal direction from one end toward the other end. The longitudinal direction of first exhaust treatment device 1 extends along the fore/aft direction of hydraulic excavator 50.

Intermediate pipe 3 is connected to the other end side in the longitudinal direction of first exhaust treatment device 1. Intermediate pipe 3 is connected to a lower side of first exhaust treatment device 1. Intermediate pipe 3 has a first end portion connected to first exhaust treatment device 1, a second end portion connected to second exhaust treatment device 2, and a central portion located between the first end portion and the second end portion.

The central portion of intermediate pipe 3 extends substantially in parallel to first exhaust treatment device 1. Specifically, the central portion of intermediate pipe 3 extends linearly substantially in the same direction as the longitudinal direction of first exhaust treatment device 1. The central portion of intermediate pipe 3 extends along the fore/aft direction of hydraulic excavator 50.

The first end portion of intermediate pipe 3 is connected to the central portion as being bent upward from the central portion of intermediate pipe 3. The second end portion of intermediate pipe 3 is connected to the central portion as being bent downward from the central portion of intermediate pipe 3. Each of the first end portion and the second end portion of intermediate pipe 3 may be bent at a right angle to the central portion of intermediate pipe 3 or at an acute angle or an obtuse angle.

The first end portion and the second end portion of intermediate pipe 3 extend in directions vertically opposite to each other with respect to the central portion of intermediate pipe 3. Intermediate pipe 3 has, for example, a substantially S shape (or a substantially Z shape).

Reducing agent pipe 36a is connected to intermediate pipe 3. This reducing agent pipe 36a connects reducing agent tank 36 and intermediate pipe 3 to each other as shown in FIG. 2. This reducing agent pipe 36a allows supply of the reducing agent stored in reducing agent tank 36 into intermediate pipe 3.

As shown in FIG. 3, reducing agent pipe 36a is connected to a side of the first end portion, in the longitudinal direction of intermediate pipe 3. A portion P of connection of reducing agent pipe 36a to intermediate pipe 3 is on an upstream side of an exhaust path in intermediate pipe 3. Thus, the reducing agent supplied by injection into intermediate pipe 3 is mixed evenly with an exhaust while it flows from upstream to downstream in intermediate pipe 35.

Intermediate pipe 3 is connected to one end side in the longitudinal direction of second exhaust treatment device 2. Intermediate pipe 3 is connected to an upper side of second exhaust treatment device 2.

Second exhaust treatment device 2 has an outer geometry substantially in a columnar shape. Second exhaust treatment device 2 extends linearly in the longitudinal direction from one end toward the other end. The longitudinal direction of second exhaust treatment device 2 extends along the fore/aft direction of hydraulic excavator 50.

Tail pipe 5 is connected to the other end of second exhaust treatment device 2. Tail pipe 5 extends upward from a portion of connection to second exhaust treatment device 2.

Tail pipe 5 has an inclined portion located below and an erecting portion located above. A lower end of the inclined portion of tail pipe 5 is connected to second exhaust treatment device 2. The inclined portion of tail pipe 5 extends from a lower end connected to second exhaust treatment device 2 in a direction, for example, orthogonal to the longitudinal direction of second exhaust treatment device 2 and obliquely upward. The inclined portion of tail pipe 5 extends from the lower end connected to second exhaust treatment device 2 toward engine 35.

A lower end of the erecting portion of tail pipe 5 is connected to an upper end of the inclined portion of tail pipe 5. The erecting portion of tail pipe 5 extends vertically upward from the lower end thereof. An upper end opening is formed in an upper end of the erecting portion of tail pipe 5. An exhaust gas is emitted into atmosphere through the upper end opening of the erecting portion of tail pipe 5.

As shown with an arrow in FIG. 3, the exhaust emitted from engine 35 successively passes through connection pipe 4, first exhaust treatment device 1, intermediate pipe 3, second exhaust treatment device 2, and tail pipe 5, and emitted into atmosphere through the upper end opening of tail pipe 5. For a flow of the exhaust from engine 35, first exhaust treatment device 1 is arranged downstream of engine 35 and second exhaust treatment device 2 is arranged downstream of first exhaust treatment device 1.

A direction of flow of the exhaust in first exhaust treatment device 1 is the same as a direction of flow of the exhaust in second exhaust treatment device 2. Each of the directions of flow of the exhaust in first and second exhaust treatment devices 1 and 2 is reverse to the direction of flow of the exhaust in the central portion of intermediate pipe 3.

Specifically, each of the directions of flow of the exhaust in first and second exhaust treatment devices 1 and 2 is a direction from the front to the rear of hydraulic excavator 50. The direction of flow of the exhaust in the central portion of intermediate pipe 3 is a direction from the rear to the front of hydraulic excavator 50.

The upper end opening of the erecting portion of tail pipe 5 opens toward the rear of hydraulic excavator 50. Therefore, the exhaust is emitted from the upper end opening of tail pipe 5 to the rear of hydraulic excavator 50.

For example, a diesel particulate filter device is employed as first exhaust treatment device 1. The diesel particulate filter device mainly has a filter. The diesel particulate filter device collects particulate matters contained in an exhaust from engine 35 with the filter. The filter is made, for example, of ceramics. With this diesel particulate filter device, a concentration of the particulate matters in the exhaust can be lowered.

For example, a selective catalytic reduction device is employed as second exhaust treatment device 2. The selective catalytic reduction device lowers a concentration of nitrogen oxide in the exhaust, for example, by reducing nitrogen oxide contained in the exhaust through reaction with the reducing agent and chemically changing nitrogen oxide into harmless nitrogen gas. The selective catalytic reduction device is a device treating an exhaust from engine 35 and serves to reduce nitrogen oxide NO by hydrolyzing a urea solution as the reducing agent. The selective catalytic reduction device applies, in principle, reduction of ammonia ($NH_3$) to nitrogen ($N_2$) and water ($H_2O$) as a result of chemical reaction with nitrogen oxide ($NO_x$).

Here, ammonia is not loaded on hydraulic excavator 50, but for example, reducing agent tank 36 containing a urea solution is mounted on hydraulic excavator 50 as the reducing agent tank. For example, the urea solution is suitably used as the reducing agent, however, the reducing agent is not limited thereto, and anything which can reduce nitrogen oxide NO is acceptable.

A reducing agent and a precursor of the reducing agent are herein collectively referred to as a "reducing agent". A diesel oxidation catalyst device may be employed as first exhaust treatment device 1, and any combination of the diesel particulate filter device, the diesel oxidation catalyst device, and the selective catalytic reduction device may be employed as first exhaust treatment device 1 and second exhaust treatment device 2.

Exhaust treatment unit 10 is supported on revolving frame 34 by a support member 12. Support member 12 mainly has leg portions 12a, 12b, and 12c, a support portion 12d, and a coupling portion 12e.

Support portion 12d is a portion for supporting exhaust treatment unit 10 from below. Second exhaust treatment device 2 included in exhaust treatment unit 10 is carried on support portion 12d. Support portion 12d is formed, for example, from a flat plate and extends in the fore/aft direction longer than in the direction of vehicle width of hydraulic excavator 50.

The length of support portion 12d in the fore/aft direction is longer than a length of second exhaust treatment device 2 in the longitudinal direction (the fore/aft direction). Thus, support portion 12d is located on a lower side over the entire length in the longitudinal direction of second exhaust treatment device 2.

Each of leg portions 12a, 12b, and 12c has an upper end and a lower end. The upper end of each of leg portions 12a, 12b, and 12c is attached to support portion 12d, for example, with a fastening member such as a bolt.

Leg portion 12a is attached to a rear end side of support portion 12d. Leg portion 12b is attached to a front end side of support portion 12d with coupling portion 12e being interposed. Leg portion 12c is attached to a front end portion of support portion 12d.

Each of leg portions 12a, 12b, and 12c extends downward from the upper end attached to support portion 12d toward the lower end (revolving frame 34). The lower end of each of leg portions 12a, 12b, and 12c is attached to revolving frame 34 with a fastening member such as a bolt.

Each of leg portions 12a and 12b is attached to center frame 34F, and leg portion 12c is attached to right deck frame 34R. Specifically, right vertical plate 34a of the pair of vertical plates 34a included in center frame 34F has projecting fixation portions 34a1 and 34a2.

Each of projecting fixation portions 34a1 and 34a2 is formed integrally with right vertical plate 34a by welding or the like. Projecting fixation portion 34a1 projects from a right side surface of right vertical plate 34a toward right deck frame 34R. Projecting fixation portion 34a2 projects from a left side surface of right vertical plate 34a toward center frame 34F. Upper plate 34a3 located at the upper end of each of the pair of vertical plates 34a is also formed integrally with vertical plate 34a by welding or the like.

The lower end of leg portion 12a is attached to an upper surface of projecting fixation portion 34a1 with a fastening member. The lower end of leg portion 12b is attached to an upper surface of projecting fixation portion 34a2 with a fastening member.

Right deck frame 34R has a plate fixation portion 34d and a support portion 34e. Plate fixation portion 34d is located above bottom plate 34b and has a shape of a flat plate. Support portion 34e is erected upward from the upper surface of bottom plate 34b and supports plate fixation portion 34d against bottom plate 34b. Support portion 34e is formed integrally with both of bottom plate 34b and plate fixation portion 34d by welding or the like.

The lower end of leg portion 12c is attached to an upper surface of plate fixation portion 34d with a fastening member.

Leg portion 12a is attached to projecting fixation portion 34a1 on a side of right deck frame 34R with respect to right vertical plate 34a. Leg portion 12b is attached to projecting fixation portion 34a2 on a side of center frame 34F with respect to right vertical plate 34a. Leg portion 12a and leg portion 12b are supported on vertical plate 34a on sides laterally (the direction of vehicle width) opposite to each other with respect to right vertical plate 34a. Leg portion 12b and leg portion 12c are supported on vertical plate 34a laterally (the direction of vehicle width) opposite to each other with respect to right vertical plate 34a. Leg portion 12a and leg portion 12c are supported on revolving frame 34 on laterally (the direction of vehicle width) the same side with respect to right vertical plate 34a.

Figure 4:
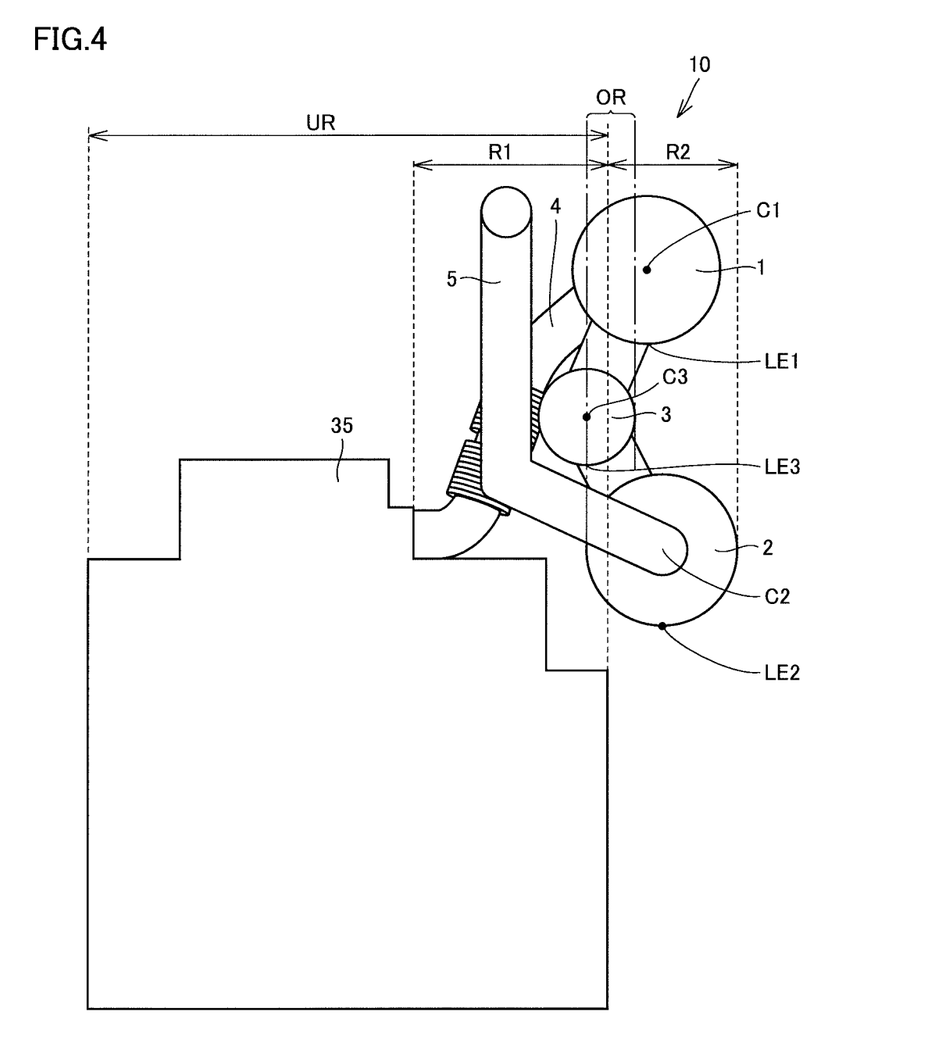
FIG. 4 is a rear view showing positional relation between the exhaust treatment unit and the engine in the hydraulic excavator shown in FIG. 1.

FIG. 4 is a rear view showing positional relation between the exhaust treatment unit and the engine in the hydraulic excavator shown in FIG. 1. As shown in FIG. 4, first exhaust treatment device 1 is arranged above second exhaust treatment device 2 and intermediate pipe 3. Intermediate pipe 3 is arranged between first exhaust treatment device 1 and second exhaust treatment device 2. Second exhaust treatment device 2 is arranged below first exhaust treatment device 1 and intermediate pipe 3.

Intermediate pipe 3 is superimposed on both of first exhaust treatment device 1 and second exhaust treatment device 2 in the plan view shown in FIG. 2. Specifically, in the plan view, as shown in FIG. 4, each of intermediate pipe 3, first exhaust treatment device 1, and second exhaust treatment device 2 is superimposed in a region OR.

A center C3 of a central portion of intermediate pipe 3 is displaced toward the engine from each of a center C1 of the columnar shape of first exhaust treatment device 1 and a center C2 of the columnar shape of second exhaust treatment device 2. Center C2 of the columnar shape of second exhaust treatment device 2 may be displaced toward a side opposite to engine 35, with respect to center C1 of the columnar shape of first exhaust treatment device 1.

Both of connection pipe 4 and tail pipe 5 are arranged on the same side (on the left in the direction of vehicle width) with respect to first exhaust treatment device 1. A lower end LE2 of second exhaust treatment device 2 is located at a position lower than a height position of a portion of connection between connection pipe 4 and engine 35.

Each of first exhaust treatment device 1 and intermediate pipe 3 is located at a position higher than the height position of the portion of connection between connection pipe 4 and engine 35. Each of a lower end LE1 of first exhaust treatment device 1 and a lower end LE3 of intermediate pipe 3 is located at a position higher than the height position of the portion of connection between connection pipe 4 and engine 35.

A region R1 of exhaust treatment unit 10 is located in a region UR directly above engine 35, and a region R2 of exhaust treatment unit 10 is located as being displaced from region UR directly above engine 35 (out of a range of region UR directly above). Each of intermediate pipe 3, first exhaust treatment device 1, and second exhaust treatment device 2 may be arranged in its entirety as being displaced from region UR directly above engine 35. The entire tail pipe 5 may be arranged as being displaced from region UR directly above engine 35.

Figure 5:
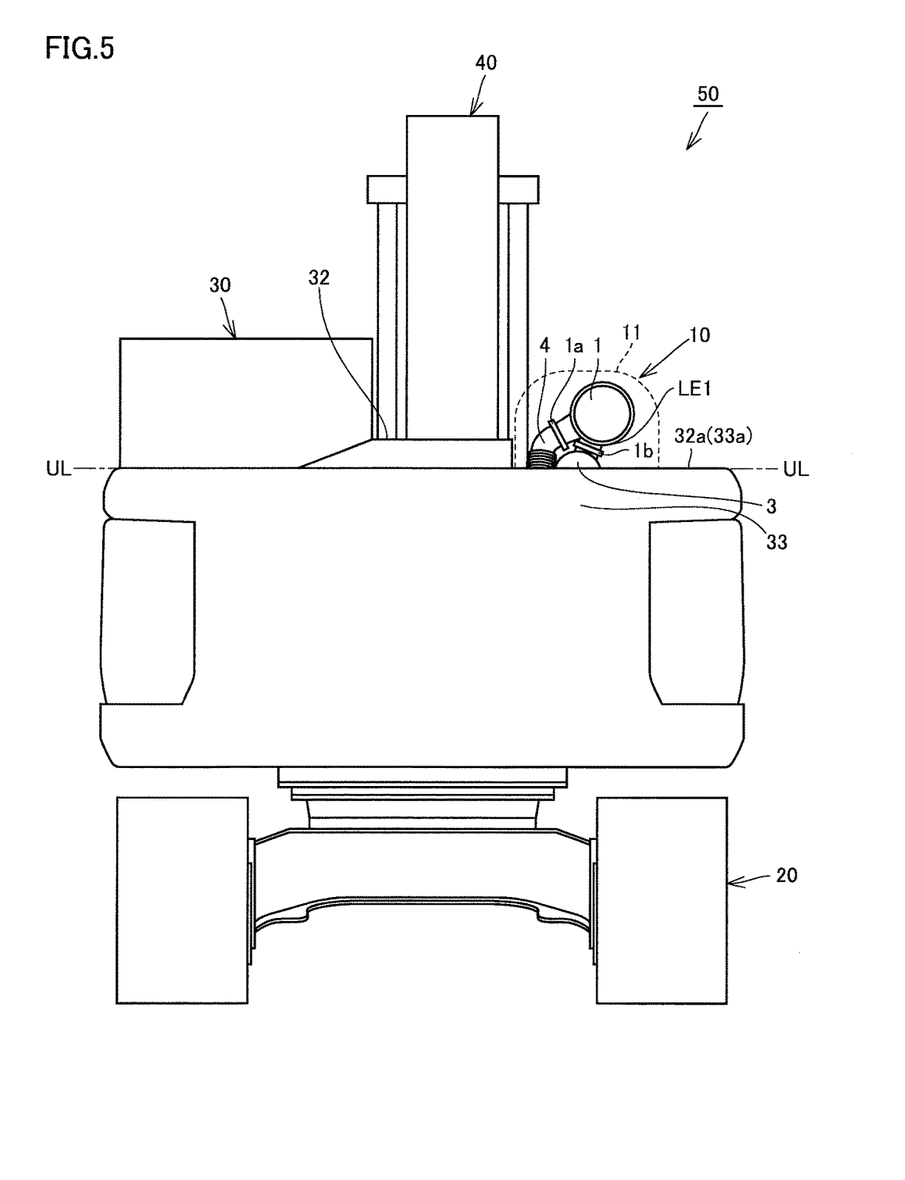
FIG. 5 is a rear view showing that a part of the exhaust treatment unit is located above an upper surface of the counterweight in the hydraulic excavator shown in FIG. 1.

FIG. 5 is a rear view showing that a part of the exhaust treatment unit is located above an upper surface of the counterweight in the hydraulic excavator shown in FIG. 1. In FIG. 5, for the sake of convenience of explanation of the figure, illustration of the tail pipe of the exhaust treatment unit is not provided and an outer geometry of the exhaust treatment cover is shown with a dashed line.

As shown in FIGS. 1 and 5, a height position of an upper surface 32a of engine hood 32 is located at a position slightly higher than a height position (a chain dotted line UL-UL) of an upper surface 33a of counterweight 33. The entire first exhaust treatment device 1 is located above the height position of upper surface 33a of counterweight 33. Lower end LE1 of first exhaust treatment device 1 is located above the height position of upper surface 33a of counterweight 33.

A first connection portion 1a between connection pipe 4 and first exhaust treatment device 1 and a second connection portion 1b between first exhaust treatment device 1 and intermediate pipe 3 are located above the height position of upper surface 33a of counterweight 33.

A function and effect of the present embodiment will now be described.

According to the present embodiment, as shown in FIG. 4, intermediate pipe 3 is superimposed on both of first exhaust treatment device 1 and second exhaust treatment device 2 in region OR in the plan view. Thus, first exhaust treatment device 1, second exhaust treatment device 2, and intermediate pipe 3 are arranged as being aligned in the upward/downward direction and superimposed in region OR. Therefore, a two-dimensional area occupied by these members 1, 2, and 3 can be smaller than in the case that these members 1, 2, and 3 are arranged in fore/aft and/or lateral direction. Therefore, as shown in FIG. 2, even in a small-sized hydraulic excavator in which counterweight 33 is located in the direction of width of the vehicle with respect to first and second exhaust treatment devices 1 and 2 in the plan view, exhaust treatment unit 10 including these members 1, 2, and 3 can be arranged in the engine compartment.

Normally, when maintenance of exhaust treatment unit 10 is provided, a serviceperson accesses the exhaust treatment unit from above exhaust treatment unit 10. In the present embodiment, as shown in FIG. 4, first exhaust treatment device 1 is arranged above intermediate pipe 3 and second exhaust treatment device 2 is arranged below intermediate pipe 3. Therefore, maintenance of first exhaust treatment device 1 arranged above second exhaust treatment device 2 and intermediate pipe 3 is facilitated.

In particular when a diesel particulate filter device is employed as first exhaust treatment device 1, for the diesel particulate filter device, maintenance for eliminating clogging with soot (graphite) is required. Therefore, as the diesel particulate filter device is located as first exhaust treatment device 1 above intermediate pipe 3, maintenance of the diesel particulate filter device is facilitated.

As shown in FIG. 4, since first exhaust treatment device 1 is arranged above second exhaust treatment device 2 and intermediate pipe 3, a long distance in the upward/downward direction from engine 35 to first exhaust treatment device 1 can be ensured. Therefore, a length of connection pipe 4 connecting engine 35 and first exhaust treatment device 1 to each other can be long and arrangement of bellows portions 4a and 4b in connection pipe 4 is facilitated.

As bellows portions 4a and 4b are provided in connection pipe 4, connection pipe 4 can deform by extension and contraction in attachment of exhaust treatment unit 10 to revolving frame 34. Therefore, connection of connection pipe 4 between first exhaust treatment device 1 and engine 35 is facilitated and assembly is facilitated.

Even though there is position displacement between engine 35 and revolving frame 34 or position displacement between exhaust treatment unit 10 and revolving frame 34, connection pipe 4 can be connected between first exhaust treatment device 1 and engine 35 because connection pipe 4 can deform by extension and contraction owing to bellows portions 4a and 4b.

As shown in FIGS. 1 and 5, first exhaust treatment device 1 is located above upper surface 33a of counterweight 33. Thus, maintenance of first exhaust treatment device 1 can be provided without a serviceperson extending his/her hand into the engine compartment. Therefore, maintenance of exhaust treatment unit 10 is facilitated.

As shown in FIG. 5, both of first connection portion 1a between connection pipe 4 and first exhaust treatment device 1 and second connection portion 1b between first exhaust treatment device 1 and intermediate pipe 3 are located above upper surface 33a of counterweight 33. Therefore, first and second connection portions 1a and 1b can be attached and removed without a serviceperson extending his/her hand into the engine compartment, and first exhaust treatment device 1 can readily be attached to and removed from exhaust treatment unit 10.

As shown in FIG. 4, both of connection pipe 4 and tail pipe 5 are arranged on the same side (for example, on the left) in the direction of vehicle width with respect to first exhaust treatment device 1. Therefore, in this case, as compared with a case that connection pipe 4 and tail pipe 5 are arranged on sides opposite to each other in the direction of vehicle width with respect to first exhaust treatment device 1, increase in two-dimensional area occupied by exhaust treatment unit 10 can further be suppressed. Therefore, even in a small-sized hydraulic excavator, exhaust treatment unit 10 can be arranged in the engine compartment.

If exhaust treatment unit 10 should be supported on engine 35 with a support member being interposed in FIG. 3 (in what is called engine mount), it would be necessary to arrange a support member between exhaust treatment unit 10 and engine 35. Therefore, exhaust treatment unit 10 would be arranged at a high position when viewed from engine 35, by a height comparable to arrangement of the support member on engine 35. In this case, as shown in FIGS. 1 and 5, a height of first exhaust treatment device 1 protruding upward from upper surface 33a of counterweight 33 is greater, and consequently exhaust treatment unit 10 may block a field of view in the rear of an operator who operates hydraulic excavator 50.

If exhaust treatment unit 10 should be supported on engine 35 with a support member being interposed in FIG.

3, in an attempt to arrange exhaust treatment unit 10 as being displaced from a region directly above engine 35, the center of gravity of exhaust treatment unit 10 might be displaced from the region directly above engine 35. In this case, support of exhaust treatment unit 10 might become unstable. When exhaust treatment unit 10 is arranged in the region directly above engine 35 with the support member being interposed as described above, exhaust treatment unit 10 may block a field of view in the rear of an operator who operates hydraulic excavator 50.

In contrast, in the present embodiment, as shown in FIG. 3, exhaust treatment unit 10 is supported on revolving frame 34 by support member 12, not on engine 35. Thus, since it is not necessary to interpose a support member between exhaust treatment unit 10 and engine 35 exhaust treatment unit 10 can be arranged closer to engine 35 than in the case of engine mount. Therefore, a height position of exhaust treatment unit 10 can be lowered and visual recognition of the rear by an operator who operates hydraulic excavator 50 is good.

Since exhaust treatment unit 10 is supported on revolving frame 34 not on engine 35, arrangement of exhaust treatment unit 10 as being displaced from region UR directly above engine 35 (FIG. 4) in the fore, aft, left, and/or right direction is facilitated. Therefore, as compared with the case that exhaust treatment unit 10 is arranged in the region directly above engine 35, the height position of exhaust treatment unit 10 can be lowered and visual recognition of the rear by an operator who operates hydraulic excavator 50 is good.

Since arrangement of exhaust treatment unit 10 as being displaced from region UR directly above engine 35 (FIG. 4) in the fore, aft, left, and/or right direction is facilitated, service of engine 35 from above is facilitated.

As shown in FIG. 3, engine 35 is mounted on center frame 34F and support member 12 has leg portions 12a and 12b attached to center frame 34F. Thus, engine 35 mounted on center frame 34F and exhaust treatment unit 10 supported by support member 12 attached to center frame 34F can be in accurate registration with each other.

Though description has been given in the embodiment above for a short tail swing radius hydraulic excavator, the present invention is applicable to hydraulic excavators in general.

It should be understood that the embodiment disclosed herein is illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 first exhaust treatment device; 2 second exhaust treatment device; 1a first connection portion; 1b second connection portion; 3 intermediate pipe; 4 connection pipe; 4a, 4b bellows portion; 5 tail pipe; 10 exhaust treatment unit; 12 support member; 12a, 12b, 12c leg portion; 12d support portion; 12e coupling portion; 20 travel unit; 21 crawler belt apparatus; 30 revolving unit; 31 operator's cab; 32 engine hood; 32a, 33a upper surface; 33 counterweight; 34 revolving frame; 34F center frame; 34R right deck frame; 34L left deck frame; 34a vertical plate; 34a1, 34a2 projecting fixation portion; 34a3 upper plate; 34b bottom plate; 34c coupling plate; 34d plate fixation portion; 34e support portion; 35 engine; 36 reducing agent tank; 36a reducing agent pipe; 40 work implement; 41 boom; 42 arm; 43 bucket; and 50 hydraulic excavator.

The invention claimed is:

1. A hydraulic excavator, comprising:
an engine;
a first exhaust treatment device which treats an exhaust gas emitted from said engine;
a second exhaust treatment device which treats the exhaust gas which has passed through said first exhaust treatment device;
an intermediate pipe which guides the exhaust gas which has passed through said first exhaust treatment device to said second exhaust treatment device and is superimposed on both of said first exhaust treatment device and said second exhaust treatment device in a plan view; and
a counterweight located in a direction of width of a vehicle with respect to said first exhaust treatment device and said second exhaust treatment device in the plan view.

2. The hydraulic excavator according to claim 1, wherein said first exhaust treatment device is arranged above said intermediate pipe and said second exhaust treatment device is arranged below said intermediate pipe.

3. The hydraulic excavator according to claim 2, wherein said first exhaust treatment device is a diesel particulate filter device.

4. The hydraulic excavator according to claim 2, wherein said first exhaust treatment device is located above an upper surface of said counterweight.

5. The hydraulic excavator according to claim 4, further comprising a connection pipe which guides the exhaust gas emitted from said engine to said first exhaust treatment device, wherein
a first connection portion between said connection pipe and said first exhaust treatment device and a second connection portion between said first exhaust treatment device and said intermediate pipe are located above the upper surface of said counterweight.

6. The hydraulic excavator according to claim 5, further comprising a tail pipe which emits the exhaust gas which has passed through said second exhaust treatment device into atmosphere, wherein
both of said connection pipe and said tail pipe are arranged on a same side with respect to said first exhaust treatment device.

7. The hydraulic excavator according to claim 1, further comprising:
a revolving frame which supports said engine; and
a support member which supports said first exhaust treatment device, said second exhaust treatment device, and said intermediate pipe on said revolving frame.

8. The hydraulic excavator according to claim 7, wherein said revolving frame has a center frame,
said engine is mounted on said center frame, and
said support member has a portion attached to said center frame.

* * * * *